United States Patent [19]

Strauss

[11] Patent Number: 4,713,892

[45] Date of Patent: Dec. 22, 1987

[54] APPARATUS FOR THE PROTECTION OF A MOVABLE ELONGATE MACHINE PART

[75] Inventor: Bernhard Strauss, Nattheim, Fed. Rep. of Germany

[73] Assignee: Carl-Zeiss-Stiftung, Heidenhime/Brenz, Oberkochen, Fed. Rep. of Germany

[21] Appl. No.: 910,123

[22] Filed: Jul. 8, 1986

[30] Foreign Application Priority Data

Jul. 27, 1985 [DE] Fed. Rep. of Germany ....... 3527063

[51] Int. Cl.⁴ .............................................. G01B 7/28
[52] U.S. Cl. ................................ 33/559; 33/169 R; 33/172 E; 33/556
[58] Field of Search .......................... 33/503–506, 33/559, 560, 561, 556, 558, 572, 1 M, 23.11; 340/678, 679, 680, 686

[56] References Cited

U.S. PATENT DOCUMENTS

4,364,180 12/1982 Willhelm et al. ................. 33/503 X
4,578,873 4/1986 Klingler et al. .................. 33/169 R

*Primary Examiner*—Harry N. Haroian
*Attorney, Agent, or Firm*—Hopgood, Calimafde, Kalil, Blaustein & Judlowe

[57] ABSTRACT

For protecting an elongate machine part (e.g., the z-quill of a measurement machine) from collision in the course of movement transverse to its longitudinal axis (z), an angularly distributed plurality of directionally responsive ultrasonic transducers is disposed about the quill (4), with their response axes oriented in the direction of the longitudinal axis of the quill. A time-multiplexed echo-ranging operation of some of these transducers is limited to those adjacent transducers which are on an arc that is convex in the instantaneous x-y direction of quill displacement. The sonic-response lobes of the transducers effectively define a protective semicylindrical sonic envelope arranged in front of the quill as it moves in the x-y plane.

If an obstacle enters into the sonic envelope and echo-ranging measurement of the obstacle ordinate $z_H$ is found to be less than the effective extended length of $z_P$ of the quill, then the control computer of the measurement machine, with due consideration of the instantaneous speed of the quill, calculates the place or time as from which the machine must be braked in order to avoid a collision.

10 Claims, 4 Drawing Figures

APPARATUS FOR THE PROTECTION OF A MOVABLE ELONGATE MACHINE PART

BACKGROUND OF THE INVENTION

In machine construction, and particularly in the construction of coordinate-measurement machines, an elongate movable machine part, such as the quill which carries the measurement tool, extends into the working or measurement region, and it is frequently necessary to protect the tool from unintended collisions. And it is further necessary to provide assurance against any possibility of injury to the operating personnel by moving parts of the machine.

For this purpose, it is known, inter alia from EP-A1-116,807 to produce an envelope-shaped light curtain around the quill of a measurement machine of bridge-type construction; when the curtain is pierced, the machine is stopped. This known protective device requires a ring of reflectors or receivers at the lower end of the quill which carries the measurement sensor. But such a device has disadvantages. On the one hand, the reflector ring and the sensor-head parts located below the reflector ring are unprotected and can be damaged in the event of a collision. On the other hand, the physical size of the ring of reflectors effectively increases the transverse dimensions beyond the amount needed to accommodate the quill. Further, the ring of receivers is an obstacle to the mounting or dismounting of the quill and must first be removed.

A coordinate-measurement machine of portal-type construction is also known to provide quill protection via tension springs; these springs are distributed around the quill and are at different electrical potential than the body of the machine.

In the event of a collision, the machine is stopped upon contact between quill and tension springs. In this case, a ring is also necessary at the lower end of the quill, in order to tension the springs. Furthermore, this known apparatus affords protection only when the obstacle or the quill itself consists of electrically conductive material. But measurement machines, including the quill, are increasingly being made of granite.

It is further known to use ultrasonic sensors for collision protection, among other things in the case of rail vehicles. In such case, a sonic transmitter sends out a pulse in the direction of movement of the vehicle, and, from its travel time or the travel time of its echo, the distance from an obstacle is determined; a switching process is initiated should said time be less than a predetermined safety distance. However, this principle does not readily lend itself to providing anti-collision assurance for transverse movement of the quill of a measurement machine; the sonic sensors have a certain lag time and as a result do not permit measurement within short-distance ranges of less than about 250-mm. In the case of measurement machines, however, in most cases the object to be measured itself forms the obstacle, and it must be possible to bring measurement probes as close as possible to the object to be measured. Furthermore, to assure protection against collision for an elongate part, it is necessary to use a plurality of sonic sensors, the echo signals of which, however, interfere with each other.

BRIEF STATEMENT OF THE INVENTION

The object of the present invention is to provide a method and an apparatus (a) for protecting an elongate machine part which is movable in several directions, including directions transverse to its longitudinal direction, (b) requiring as few changes as possible in the machine part itself, and (c) operating dependably even within the region of short distances.

The invention achieves this object in the described context of protecting the z-quill of a measurement machine from collision in the course of movement transverse to its longitudinal axis (z). An angularly distributed plurality of directionally responsive ultrasonic transducers is disposed about the quill (4), with their response axes oriented in the direction of the longitudinal axis of the quill. A time-multiplexed echo-ranging operation of some of these transducers is limited to those adjacent transducers which are on an arc that is convex in the instantaneous x-y direction of quill displacement. The sonic-response lobes of the transducers effectively defines a protective semi-cylindrical sonic envelope arranged in front of the quill as it moves in the x-y plane.

If an obstacle enters into the sonic envelope and echo-ranging measurement of the obstacle ordinate $z_H$ is found to be less than the effective extended length $z_P$ of the quill, then the control computer of the measurement machine, with due consideration of the instantaneous speed of the quill, calculates the place or time as from which the machine must be braked in order to avoid a collision.

More particularly, the machine part is protected by a plurality of directionally responsive ultrasonic transmitters or sensors which do not radiate in the direction of the movement to be protected, but rather in the direction of the longitudinal axis of the machine part. In the case of the probe-equipped quill of a measurement machine, a signal is produced upon the entry of an obstacle into the sonic field around the quill and its probe; this signal is further processed to initiate the braking process. It is thus possible to activate only very few sonic transmitters in order to develop the sonic envelope, namely those by which the region lying in front of the machine part, as seen in the direction of travel, is protected, since the geometry of the sonic-response cone which can be emitted by the transmitters is adapted to the elongate shape of the machine part and covers said shape. Since only some (but not all) sonic transmitters arrayed around the machine part need be excited at any given time, very short lag times of the system can be obtained.

The sonic transducers also operate as receivers and can be arrayed in a single plane. They therefore can be mounted to but a single side of the support or cross-slide to which the elongate machine part is secured or guided. There is no need to effect any changes in the part to be protected, since the transducer array is on the support or cross-slide, and it is remote from the location of probe contact with a workpiece. No reflector ring is needed because transducer response is to the echo from the obstacle or from the workpiece; it is this echo which is evaluated, and a potential collision is recognized by comparison of the known z-axis length of the machine part with the travel time of the received echo. Although, in principle, it is possible to stop the machine as soon as an obstacle is detected within the envelope of sonic response, it is preferred that its position be determined in the transverse plane (x, y) within which the machine part is traversed, with due consideration of (a) the instantaneous direction of movement, (b) the geometry of the sonic-response envelope, and (c) the actual position of the machine part. This preference makes it possible to initiate the braking process only when or at the point where absolutely necessary, with due consideration of the speed of the machine part and known deceleration values of the machine.

Thus, it is possible to reduce the speed of the movable part stepwise, after detected entrance of an obstacle into the zone of sonic response and thus to further delay the time and/or place at which complete braking is effected. This permits very close approach to the obstacle which may, illustratively, be the workpiece which is to be measured or machined.

On the other hand, immediate initiation of the braking process is advantageous in the event that the machine is traveling at high speed at the time of obstacle detection in the sonic envelope.

It is preferred that the braking process shall neither be initiated nor that the braking coordinates be calculated unless the detected-object distance is calculated on the basis of echo-ranging travel times which are for distances less than the (z-axis) length of the machine part, thus precluding the possibility of false stops for greater detected obstacle distances. In the situation in which the machine part is movable also in the direction of its longitudinal axis, e.g., the quill of a measuring machine, it is advantageous always to determine the instantaneous z-axis length and to include this instantaneous value in the comparison with the z-axis coordinate of the obstacle, i.e., the locally applicable z-axis distance of the object from the outer end of the quill.

DETAILED DESCRIPTION

The invention will be described in detail for an illustrative embodiment, in conjunction with the accompanying drawings, in which.

Figure 1:
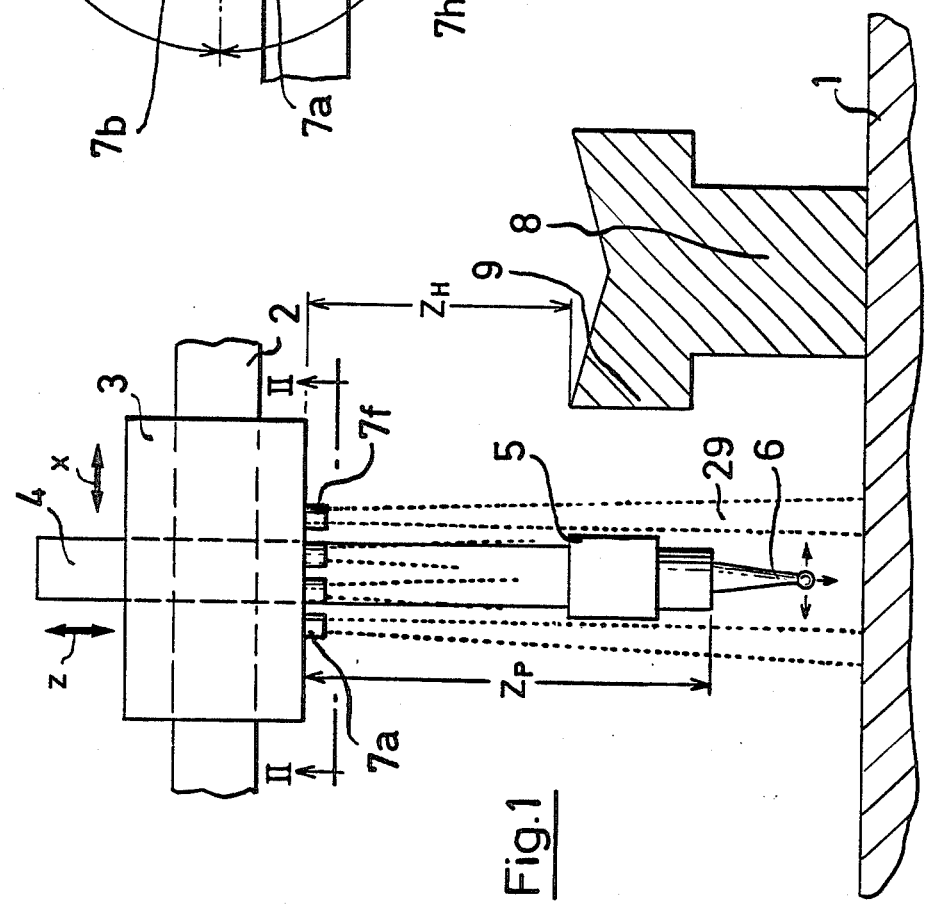
FIG. 1 is a simplified fragmentary view in elevation, to show the sonic-transducer protective device of the invention in relation to the thus-protected probe-carrying quill of a measurement machine of the bridge or portal variety.

In FIG. 1, for simplicity, the table 1 of a multi-coordinate measurement machine (of portal-type or bridge-type construction) is shown only for two (x, z) of the three axes of movement of a quill 4 with respect thereto; thus, the x-carriage 3 provides vertical guidance for z-axis displacement of the quill 4, and carriage 3 is in turn guided along bridge member 2 for the x-axis component of quill (4) displacement in the z/y plane, transverse to the elongation axis of the quill 4. The bridge 2 provides cross-slide guidance of carriage 3 and will be understood itself to be along guides (not shown) in the direction of the third coordinate y, i.e., perpendicular to the x/z plane of the drawing.

Figure 2:
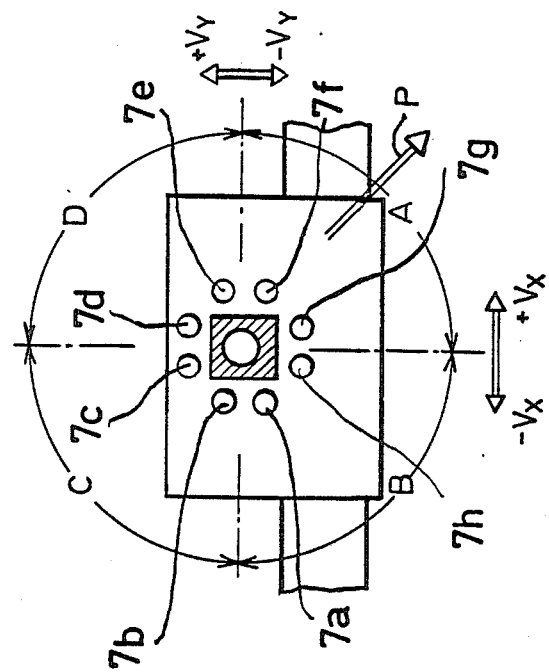
FIG. 2 is a section along the line II—II of FIG. 1.

At its lower end, quill 4 carries a sensor head 5 with a deflectable probe pin 6 for measuring a workpiece 8 on the table 1. As shown in the sectional view of FIG. 2, eight ultrasonic transducers $7a-7h$ are arrayed around the quill 4, being mounted to the bottom of the carriage 3. Each of these eight transducers 7 is highly directional, producing a narrow lobe of sonic respose which has approximately the conically widened shape shown by dashed lines in FIG. 1, in the direction toward table 1. There is thus obtained an annular envelope-shape of a sonic-response field surrounding the quill 4 and the sensor head 5 and extending to the surface of the table 1.

The sonic transducers 7 are known elements which act both as transmitters and receivers. When its input is actuated, each transducer emits a sonic pulse, and an electronic system connected to the transducers produces from the resulting echo signal a response pulse which is staggered in time, the time delay between the two pulses being a measure of the distance from the obstacle which reflects the echo. Such sonic transducers are manufactured, for example, by the Siemens Company, of Munich, Federal Republic of Germany.

The sonic field produced by the ultrasonic transducers 7 serves to protect quill 4 and the rigid part of the sensor 5, i.e., the extension length $z_P$ of the quill 4, from collision, for example, with the protruding part 9 of the measurement object 8; such protection results when the part 9 enters the sonic-response field of the transducer which has just been activated, whereby a signal is delivered to the machine control, said signal serving to initiate braking action. However, contact between the measurement object 8 and the sensor pin 6 must be permitted. The circuit arrangement of FIG. 3 makes certain, in a manner which will be described below, that braking is effected only when the distance $z_H$ in the longitudinal direction of the quill 4, i.e., the ordinate of the obstacle, is smaller than the extension length $z_P$ which is to be protected.

Since the echoes received by adjacent sonic transducers 7 can be superposed, it is necessary, should more accurate location of the position of the recognized obstacle in the horizontal plane x/y be required during the course of the signal evaluation, to excite the sonic transducers 7 in multiplex mode, i.e., individually after each other. Since in multiplex mode the lag time of the system is, however, proportional to the number of cyclically excited transducers, only four transducers in each case are excited as a function of the direction of movement of the quill 4 in the horizontal plane x/y; excitation of four adjacent transducers effectively produces a semi-cylindrical sonic envelope arranged in front of the direction of movement, i.e., the four transducers define an arcuate array in which the convex side of the array is in the direction of x/y movement. Thus, upon movement in the direction of the arrow P in FIG. 2, the transducers $7e, 7f, 7g$ and $7h$ are excited. This selection of transducers as a function of the direction of x/y movement is also effected by the circuit arrangement of FIG. 3.

It will be understood that, with suitable dimensioning, i.e., adaptation of the geometry of response lobes of transducers 7 to the dimensions of the quill 4, it may also be sufficient at any one time to excite only two transducers as a function of the direction of movement of quill 4; in such case, a finer discrimination of direction of the movement of the quill 4 is necessary. However, for the description which follows as to FIG. 3 operation, the first-mentioned case will be taken, namely, for the situation in which an array of four transducers is excited, as a function of whether the velocity vector V of quill 4 in the direction P is within one of the four quadrants A, B, C and D in the x-y plane. The association of the transducers 7 is then in accordance with the following table:

| $V_x$ | $V_y$ | Sector | Sonic Transmitter 7 | | | |
|---|---|---|---|---|---|---|
| >0 | >0 | D | c | d | e | f |
| >0 | <0 | A | e | f | g | h |
| <0 | >0 | C | a | b | c | d |
| <0 | <0 | B | g | h | a | b |

Figure 3:
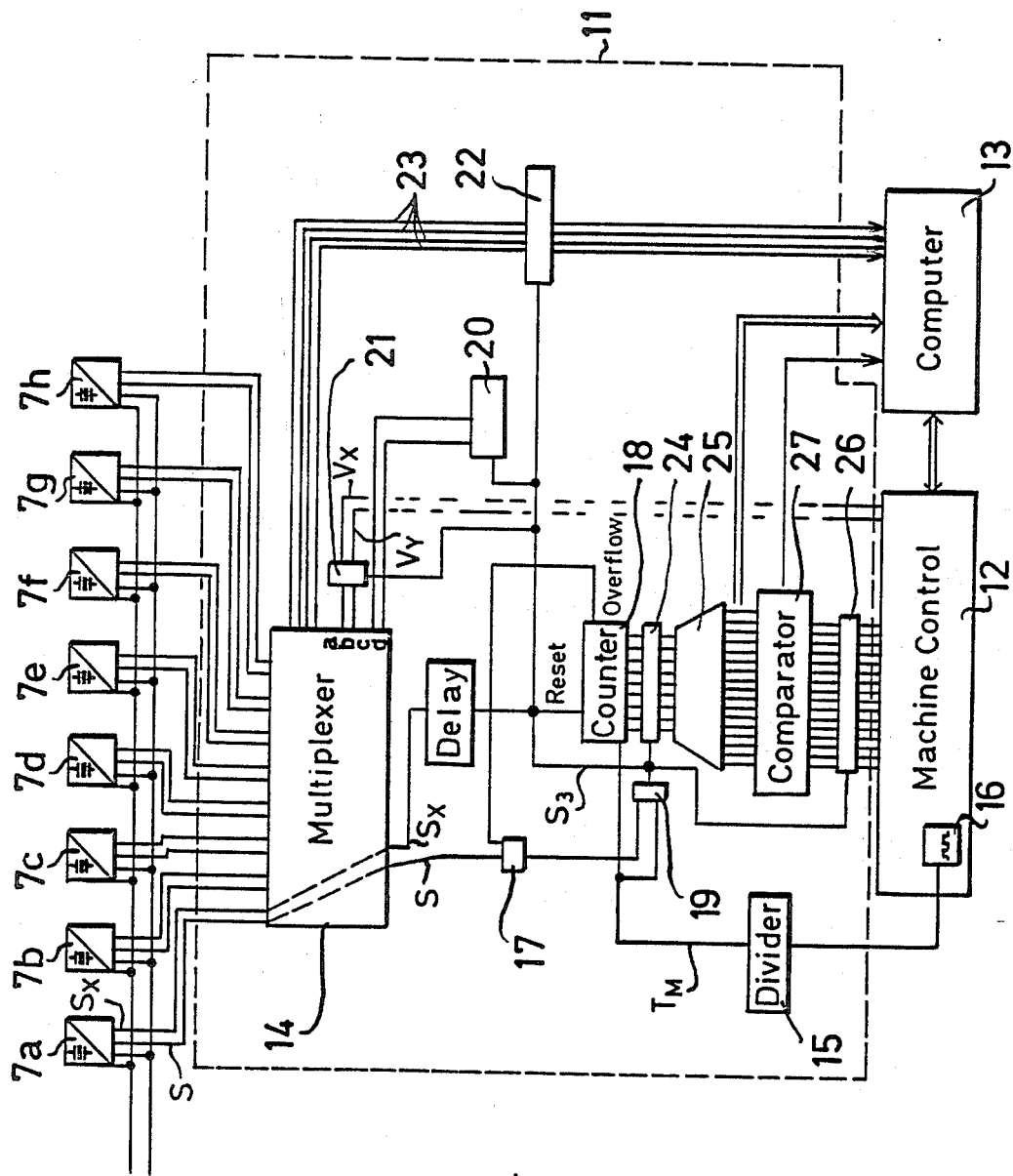
FIG. 3 is a circuit diagram for control signal evaluation of the sonic-transducer system of FIGS. 1 and 2.

In FIG. 3, a circuit 11 of discrete components partially processes echo signals supplied by transducers 7a to 7h. Circuit 11 is connected to existing control means 12 of the measuring machine and to the control computer 13 of the measuring machine.

Circuit 11 includes a multiplexer 14 which is arranged in front of the sonic transducers and via which the sonic transducers are sequentially driven (an observed for echo response) in recurrent cycles of the sequence, the pace of sequencing being at a rate derived from clock 16 of the machine control 12 and reduced by divider means 15.

Each of the sonic transducers 7 has four terminals: two or the operating voltage of pulse-shaper and amplifier componentry (not shown) associated with each of the sonic transducers, as well as a first independent input $S_x$ for transmission-pulse excitation and a second or return line S for reporting the receipt of an echo pulse. These two connections $S_x$ and S for each of the eight sonic transducers, are conducted over the multiplexer 14.

The return line S and the "overflow" output of a first counter 18 are connected to the inputs of an OR gate 17. Its output and the output of the divider 15 are combined via an AND gate 19 so that a signal which is synchronized with the clock of the machine control is always present at the output $S_3$ of gate 19 when the corresponding sonic transducer 7 has received an echo or when the counter 18 overflows, i.e., the measurement range for a given sonic pulse has been exceeded. The signal $S_3$ at the output of gate 19 is additionally fed to a two-bit counter 20, having outputs which are respectively connected to the control inputs c, d of multiplexer 14 and which serve to cyclically connect the four sonic transducers required for the specific direction of movement. The control inputs a and b of the multiplexer are operative to determine the four sonic transducers which are selected according to the direction-of-travel quadrant discussed in connection with FIG. 2; for this purpose, signals corresponding to the velocities $V_x$ and $V_y$ are fed from the machine control 12 via a memory unit 21 to the inputs a and b.

The control inputs a, b, c and d unequivocally determine which adjacent four of the eight sonic transducers 7 are currently activated in multiplexed sequence. This information is forwarded by a return line 23 which is connected via a memory unit 22 to the control computer 13 of the machine.

The input of counter 18 is connected to the output of divider 15, and the outputs representing the count of the counter 18 are fed to an 8-bit memory unit 24 which receives the content of the counter in a time cycle which is also supplied by the output $S_3$ of gate 19. The content of the counter is that number of periods of the clock frequency of divider 50 which periods are counted in the time between the transmission pulse and the echo pulse, and the count of these periods is proportional to the obstacle ordinate $z_H$. This information is translated by a converter 25 arranged behind memory unit 24 to 16-bit format in which the information concerning the specific extension length $z_P$ of quill 4 is transferred from the machine control 12 to a memory unit 26.

A comparator 27 compares the content of memory unit 26 with the translated value of memory unit 24 and feeds a control signal to the computer 13 of the measurement machine. If the comparison shows that the obstacle ordinate $z_H$ is less than the length of extension $z_P$ and the obstacle ordinate $z_H$ has been reset upon completing the preceding measurement, then the computer is caused to calculate the specific coordinates $x_P$ and $y_P$ of the quill; also, having established the obstacle coordinate $z_H$, the computer is caused to calculate the exact coordinates of the obstacle. These exact coordinates are transferred from converter 25 to computer 13, so that the computer can derive therefrom the time and/or the coordinates from which the machine must be braked, all with due consideration of the instantaneous speed and direction of the movement of quill 4. Otherwise, i.e., if the comparison shows that $z_H$ is greater then $z_P$, the obstacle ordinate is reset.

Figure 4:
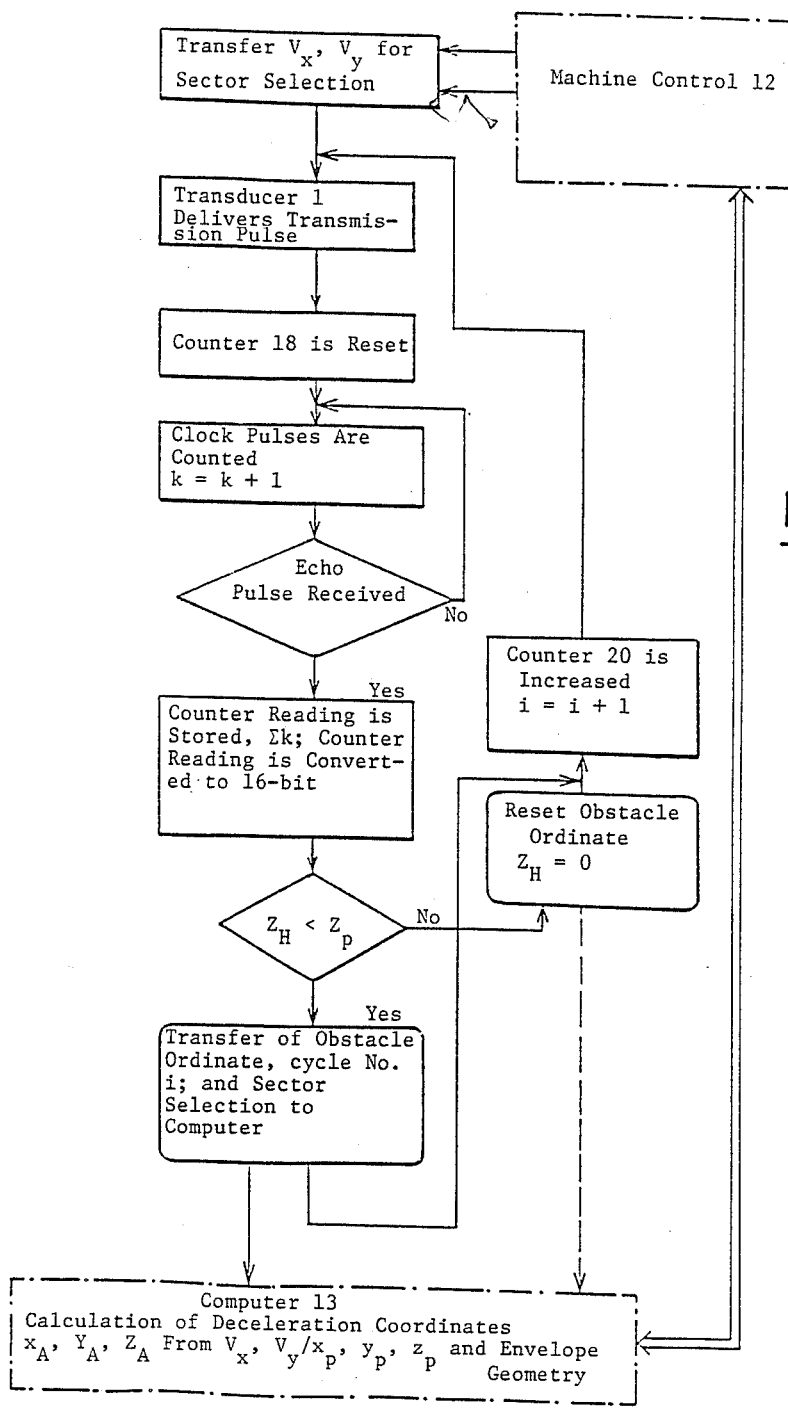
FIG. 4 is a flow chart which shows the manner of operation of the circuit of FIG. 3.

The manner of operation of the circuit arrangement 11 is also clearly shown in the flow chart of FIG. 4. And it will be understood that, instead of the discrete components of circit arrangement 11, a microprocessor which is programmed in accordance with the flow chart of FIG. 4 can alternatively be used.

What is claimed is:

1. In a multiple-coordinate measuring machine wherein an elongate quill carries a work-contact probe-equipped probe head at its outer end and is guided for x-axis positioning in a carriage having x-y displaceability, an angularly distributed plurality of ultrasonic echo-ranging transducers mounted to said carriage at uniform radial and angular spacing about said quill, each of said transducers being oriented for directional response on an axis substantially parallel to the quill axis and in radial clearance with said probe head, whereby a generally annular envelope of directional ultrasonic-response capability surrounds said probe head for various z-axis positions thereof, separate x, y, and z-axis drives for said carriage and quill, and ultrasonic proximity-detection circuitry associated with said transducers and operative to modify at least one of said drives upon proximity detection of an object within the field of at least one of said transducers, said proximity-detection circuitry including means limiting the operative range of proximity detection to distances less than at least the effective z-axis extent of said quill and probe.

2. The machine of claim 1, in which said modification is the initiation of a drive-braking operation.

3. The machine of claim 1, in which means responsive to the instantaneous direction of x-y displacement is operative to select a limited arcuate array of adjacent transducers from said plurality, said array comprising those transducers for which the arc is convex in the instantaneous direction of x-y displacement, and cyclically operative multiplexing means responsive to said displacement-direction responsive means for sequential echo-ranging operation of only the selected transducers of said arcuate array.

4. In a multiple-coordinate measuring machine wherein an elongate quill carries a work-contact probe-equipped probe head at its outer end and is guided for z-axis positioning in a carriage having x-y displaceability, an angularly distributed plurality of ultrasonic echo-ranging transducers mounted to said carriage at uniform radial and angular spacing about said quill, each of said transducers being oriented for directional response on an axis substantially parallel to the quill axis and in radial clearance with said probe head, whereby a generally annular envelope of directional ultrasonic-response capability surrounds said probe head for various z-axis positions thereof, separate x, y, and z-axis drives for said carriage and quill, and ultrasonic proximity-detection circuitry associated with each of said transducers and so operative upon said drives as to at least retard the z-axis drive of said quill upon proximity detection of an object within the field of at least one of said transducers.

5. The machine of claim 1, including computer means responsive (a) to the instantaneous speed and direction of x-y movement of said carriage and quill, (b) to the geometry of said envelope, and (c) to the detected presence of an object within said operative range of proximity detection; said computer means producing, from responses (a), (b) and (c), the coordinates of a prospective fully arrested position of the probe head in safely removed proximity to the detected object, and said computer means being operative to terminate said drives upon probe-head attainment of said coordinates.

6. The machine of claim 5, in which said computer means is further operative to reduced the speed of x-y drive upon initial detection of presence of an object within said operative range.

7. The machine of claim 6, in which in the course of reduced x-y drive speed, said computer means is operative to make at least one upgrading redetermination of the coordinates of the fully arrested position of the probe head, and said computer means being operative to terminate said drives upon probe-head attainment of the redetermined coordinates.

8. The machine of claim 7, in which said computer means is operative to make a plurality of such upgrading redeterminations prior to attainment of the most recently redetermined coordinates.

9. The machine of claim 5, in which said computer means is operative to determine said coordinates only after at least two successive determinations of object presence have been made within said operative range.

10. The machine of claim 1, in which said proximity-detection circuitry is continuously operative to change the limit of the range of proximity detection in accordance with the instantaneous z-axis position of said quill and probe.

* * * * *